United States Patent [19]

Adams

[11] Patent Number: 5,238,184

[45] Date of Patent: Aug. 24, 1993

[54] THERMOSTAT HAVING SIMPLE BATTERY LEVEL DETECTION

[75] Inventor: John T. Adams, Minneapolis, Minn.

[73] Assignee: Honeywell Inc., Minneapolis, Minn.

[21] Appl. No.: 769,043

[22] Filed: Sep. 30, 1991

[51] Int. Cl.⁵ .................... G05D 23/00; G08B 21/00
[52] U.S. Cl. .................................. 236/94; 136/293; 236/46 R; 324/436; 340/636
[58] Field of Search .............. 324/436; 236/46 R, 94; 165/12, 11.1; 340/636; 136/293

[56] References Cited

U.S. PATENT DOCUMENTS

| | | | |
|---|---|---|---|
| 4,163,193 | 7/1979 | Kamiya | 324/436 |
| 4,506,827 | 3/1985 | Jamieson et al. | 236/46 R |
| 4,816,768 | 3/1989 | Champlin | 340/636 X |

Primary Examiner—William E. Wayner
Attorney, Agent, or Firm—Robert B. Leonard

[57] ABSTRACT

A thermostat having a simple battery level detection circuit. The output of an oscillator, having a frequency dependent upon the battery level, is compared to the output of a battery level independent time base. If the two outputs are not in a predetermined relationship, all connected HVAC equipment is shut off.

4 Claims, 1 Drawing Sheet

THERMOSTAT HAVING SIMPLE BATTERY LEVEL DETECTION

BACKGROUND OF THE INVENTION

The present invention is directed towards thermostats and more specifically to thermostats having microprocessors which operate on a battery.

Thermostats having battery-operated microprocessors have become increasingly popular. The microprocessor is used to operate energy management programs which make operation of an attached heating ventilating air conditioning (HVAC) system more efficient.

However, when the battery began to lose its charge, microprocessor operation became unpredictable. As an example, if the battery charge is low enough, the microprocessor may cause a heat lock on which could be dangerous to the elderly and infants.

While battery level check detectors in thermostats are known in the art, they usually require additional circuitry which increases the cost of each individual thermostat. In addition, most thermostats only have a single level battery check which produces an indication to the user that a problem exists. Lastly, merely providing an indication that the battery level is low may not be sufficient to prevent a heat lock on.

SUMMARY OF THE INVENTION

The present invention is a thermostat having a simple two level battery level detector. The battery level detector checks the battery level and produces a visual indication to the operator if the battery level has dropped below a first level. When the battery level drops below a second level, the battery level detector then shuts off any operating HVAC equipment.

The battery level detector may be made from a time base generator and an oscillator internal to the microprocessor which produces a frequency dependent upon the battery level. When the battery is initially installed, the microprocessor compares the frequency of the internal oscillator to the time base and stores a number in memory based on the relationship between the time base and the oscillations. When the frequency of the oscillator drops below a first percentage of the number stored in memory, the battery low level indication is provided. When the frequency of the oscillator drops below a second percentage of the number which is lower than the first percentage, all HVAC equipment operating at the time is shut off.

In an alternative embodiment, the microprocessor includes a first battery check circuit, and the above described battery level detector. When the battery level drops below a first predetermined level, the first battery check circuit provides a signal to the display and triggers the battery level detector. When the frequency of the oscillator drops below a predetermined percentage of the number stored in memory, the HVAC equipment is shut off.

DETAILED DESCRIPTION OF THE PREFERRED EMBODIMENT

Figures 1, 2:
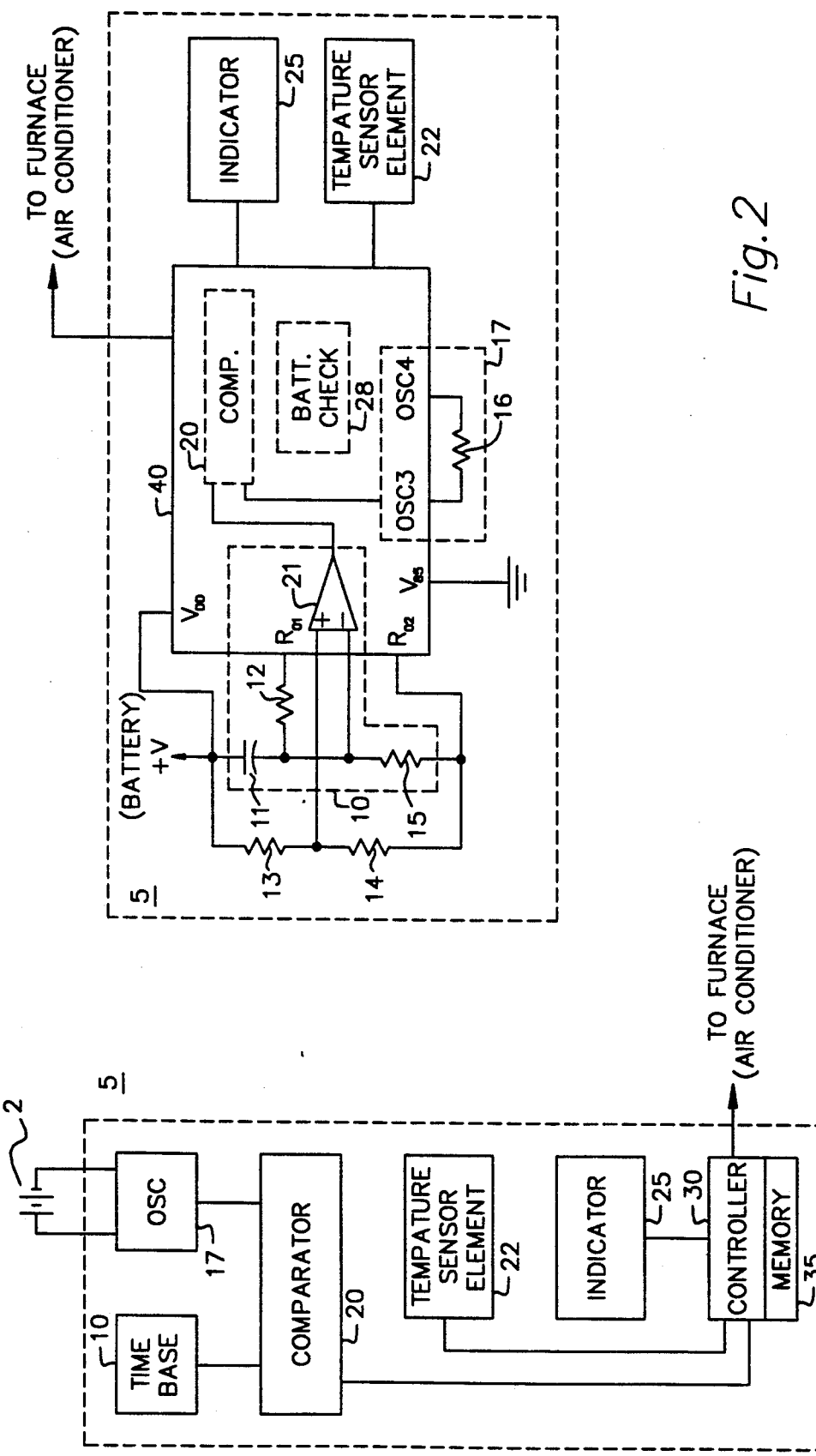
FIG. 1 is a block diagram of the thermostat of the present invention.
FIG. 2 is a schematic diagram of a preferred embodiment of the present invention.

Referring now to FIG. 1 there shown is the thermostat 5 of the present invention. Thermostat 5 operates in part on battery 2 and includes time base generator 10, oscillator 17, first comparator 20, temperature sensing element 22, indicator 25, controller 30 and memory 35.

Time base generator 10 produces an accurate time base which is independent of the level of the battery. Oscillator 17 produces a signal having a frequency $f_1$ for use in many timing applications in the microprocessor. The microprocessor includes all or portions of oscillator 17, comparator 20, controller 30 and memory 35. Comparator 20 compares the signal produced by time base 10 with the signal produced by oscillator 17. Note that comparator 20 may be a part of controller 30.

Controller 30 takes the results of the comparison from comparator 20 and compares the results (for example) to results of a previous comparison performed when a new battery was used to power oscillator 17. The results of the first comparison are stored in memory 35. If the present results are below one pre-selected percentage of the results from the comparison when the battery is new, controller 30 produces a signal to indicator 25 which causes indicator 25 to provide a low battery indication. If the results are below another preselected percentage of the results from when the battery was new, controller 30 then shuts off any operating apparatus of the HVAC system.

In another preferred embodiment, the microprocessor includes an internal battery check 28. The internal battery check determines when the battery level has fallen below a first level and then produces a signal to provide the operator with a visual indication at indicator 25. This may also trigger second comparator 30 into checking the battery level by the above described comparison of the outputs of the first comparator and the oscillator. The microprocessor operates on battery power connected to terminal $V_{DD}$ and is grounded at terminal $V_{SS}$.

Turning now to FIG. 2, there shown is a preferred embodiment of the presently inventive thermostat 5. Thermostat 5 includes time base generator 10, microprocessor 40, indicator 25, temperature sensitive element 22, and resistors 13, 14 and 16.

The microprocessor may be a 4 bit low power microprocessor which includes an oscillator 17 which produces a signal having a desired frequency by selection of an appropriate resistor 16. The microprocessor also includes first and second comparators 21 and 20. First comparator 21 compares two voltages and produces a high voltage if the voltage at a noninverting input (+) is greater than the voltage at an inverting input (−). The output port of first comparator 21 is connected to second comparator 20 as is the output of oscillator 17. Second comparator 20 compares a number of high outputs from the first comparator to the number of cycles from the oscillator. If the two counts are not in a predetermined relationship, the second comparator will produce a signal to turn off the furnace or air conditioner.

Time base generator 10 in this embodiment is made from a capacitor 11 and a resistor 12. The time base produced is the time constant of the RC circuit and depends upon the selection of the capacitor and the resistor. Regardless of battery output, the time base generated by the resistor capacitor combination will remain the same.

Periodically, the time for the RC circuit of the calibration channel is measured. This is done to ensure that variations in component values do not affect the temperature reading. When a measurement is taken ports R01 and R02 go low. Resistors 13 and 14 set a reference voltage on the non-inverting input of the comparator 21. Resistors 12 and 15 are in parallel and provide a path for capacitor 11 to charge. At the start of the measurement period, there is no charge on capacitor 11 thus the inverting input voltage is at the positive supply voltage and the output of the comparator is low. As the capacitor charges, the voltage at the inverting input will go lower than the non-inverting input. When this occurs, the output of comparator 21 goes high. The high frequency oscillator 17 is used as the time base to measure the time it takes from the start of calibration until the comparator goes high. Since the calibration channel time is constant, all the software must do is monitor changes in this count. The software stores the changes in the count in two places every time a calibration reading is made. The microprocessor has a built-in first level battery detect. When the first level's circuit determines the batteries are low, then when a calibration is made it is only stored in one place and compared against the value of the second register. When the calibration count is 1/64 smaller than the old count, then the second level battery detect has been reached.

I claim:

1. In a thermostat for controlling HVAC equipment having a battery, the battery having a power level, battery testing means, comprising:
    a time base generator producing a first signal having a frequency substantially independent of the power level;
    an oscillator producing a second signal having a frequency substantially dependent upon the power level;
    a comparator connected to said time base generator and said oscillator, said comparator shutting off said HVAC equipment if said first and second signals are not in a pre-determined relationship.

2. The battery testing means of claim 1, wherein:
    the microprocessor has an internal battery level checking means for determining when battery level drops below a first power level, said internal battery level checking means producing a low level signal, said battery level checking means being connected to said comparator; and
    said comparator is activated upon receipt of said low level signal.

3. The battery testing means of claim 2, further comprising:
    an indicator connected to said internal battery check means, said indicator providing indication to an operator that the battery has dropped below said first level.

4. A thermostat, comprising:
    temperature sensing means for producing a temperature signal representative of space temperature;
    a battery having a power level;
    temperature responsive means connected to said temperature sensing means for comparing said temperature signal with a desired temperature signal, said desired temperature signal being representative of a desired space temperature, said temperature responsive means producing a control signal representative of a difference between said space temperature and said desired space temperature;
    a first battery level check comprising:
    a time base generator producing a first signal which is substantially independent of said power level;
    an oscillator producing a second signal which is substantially dependent upon said power level; and
    a comparator connected to said time base generator and said oscillator and producing a third signal if said first and second signals are not in a pre-determined relationship, said third signal causing said temperature responsive means to become inactive.

* * * * *

UNITED STATES PATENT AND TRADEMARK OFFICE
CERTIFICATE OF CORRECTION

PATENT NO. : 5,238,184
DATED : August 24, 1993
INVENTOR(S) : John T. Adams

It is certified that error appears in the above-indentified patent and that said Letters Patent is hereby corrected as shown below:

Column 3, line 38, cancel ":" and substitute --; and--.

Signed and Sealed this

Twenty-fourth Day of May, 1994

Attest:

BRUCE LEHMAN

*Attesting Officer*          *Commissioner of Patents and Trademarks*